United States Patent [19]
Takizawa

[11] Patent Number: 5,841,815
[45] Date of Patent: Nov. 24, 1998

[54] DATA RECEIVER FOR CORRECTING A PHASE OF A RECEIVED PHASE-MODULATED SIGNAL

[75] Inventor: Hiroshi Takizawa, Yokohama, Japan

[73] Assignee: Canon Kabushiki Kaisha, Tokyo, Japan

[21] Appl. No.: 711,081

[22] Filed: Sep. 9, 1996

Related U.S. Application Data

[63] Continuation of Ser. No. 260,924, Jun. 15, 1994, abandoned.

[30] Foreign Application Priority Data

Jun. 24, 1993 [JP] Japan .................................. 5-153641

[51] Int. Cl.⁶ .................................................. H04L 27/14
[52] U.S. Cl. .......................... 375/326; 375/330; 375/332; 375/365
[58] Field of Search ..................................... 375/324, 326, 375/329, 330, 332, 354, 355, 362, 364, 365, 368, 371; 370/503, 509, 514, 516, 520

[56] References Cited

U.S. PATENT DOCUMENTS

| | | | |
|---|---|---|---|
| 4,696,008 | 9/1987 | Takei et al. | 375/365 |
| 5,177,740 | 1/1993 | Toy et al. | 375/368 |
| 5,260,671 | 11/1993 | Iso et al. | 375/336 |
| 5,301,210 | 4/1994 | Vandamme et al. | 375/329 |
| 5,337,331 | 8/1994 | Sadot et al. | 375/371 |
| 5,357,542 | 10/1994 | Suzuki | 375/211 |
| 5,422,917 | 6/1995 | Scott | 375/371 |

*Primary Examiner*—Don N. Vo
*Attorney, Agent, or Firm*—Fitzpatrick, Cella, Harper & Scinto

[57] ABSTRACT

A data receiver for transmitting data by changing the data into transmitted frames and by phase-modulating the data in a digital manner has a demodulation circuit for demodulating a phase-modulated signal by sync detection, a conversion circuit for converting the phase of an output from the demodulation circuit into a correct phase, and a sync detection circuit for detecting sync data of the transmitted frames from an output from the conversion circuit and for controlling the conversion circuit on the basis of a sync data undetected condition.

26 Claims, 7 Drawing Sheets

DATA RECEIVER FOR CORRECTING A PHASE OF A RECEIVED PHASE-MODULATED SIGNAL

This application is a continuation of application Ser. No. 08/260,924 filed Jun. 15, 1994 now abandoned.

BACKGROUND OF THE INVENTION

1. Field of the Invention

This invention relates to a data receiver for receiving phase-modulated data.

2. Description of the Related Art

Phase shift keying (PSK) modulation and amplitude phase shift keying (APSK) modulation are known as a type of digital modulation, and demodulation for this kind of modulation is performed on the basis of the homodyne detection method.

Figure 1:
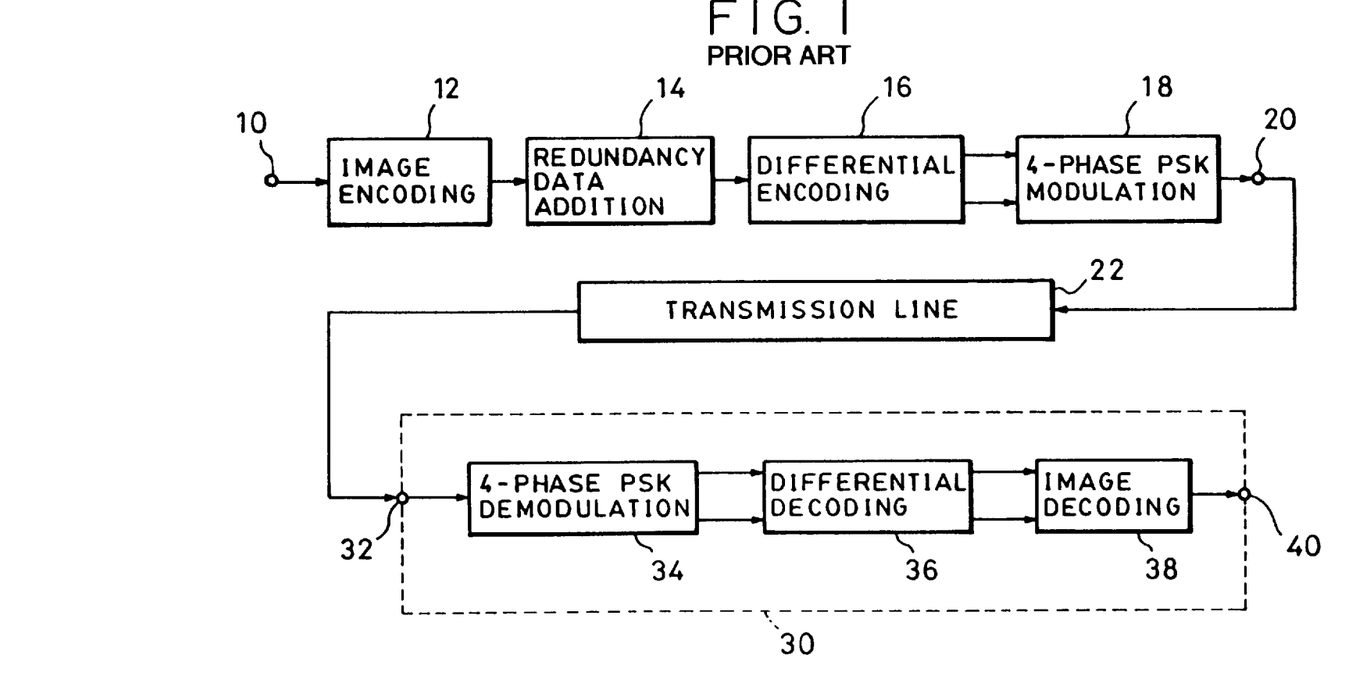
FIG. 1 is a schematic block diagram of a conventional transmission system.

An example of conventional transmission systems used for satellite communication, in which image information is transmitted on the basis of a 4-phase PSK method, will be described below. FIG. 1 is a schematic block diagram of this example.

An image signal to be transmitted is supplied to an input terminal 10. An image encoding circuit 12 encodes the image signal from the input terminal 10. A redundancy data addition circuit 14 separates output codes from the image encoding circuit 12 with respect to transmission frames, adds sync data, error correction codes and the like to the separated codes and outputs the codes to a differential encoding circuit 16.

The differential encoding circuit 16 separates output data from the redundancy data addition circuit 14 into data in two phases, i.e., an I phase and a Q phase, and outputs differential data Id and Qd representing differences from the preceding symbols to a four-phase PSK modulation circuit 18. The four-phase PSK modulation circuit 18 modulates a carrier wave with the differential data Id and Qd in a four-phase PSK modulation manner. The carrier wave four-phase PSK modulated is output to a transmission line through an output terminal 20.

The carrier wave transmitted through the transmission line 22 is supplied to an input terminal 32 of a data receiver 30. A four-phase PSK demodulation circuit 34 demodulates the modulated wave from the input terminal by homodyne detection and output differential data I$d$ and Q$d$. A differential decoding circuit 36 decodes the differential data Id and Qd output from the four-phase PSK demodulation circuit 34 and outputs data having I and Q phases. An image decoding circuit 38 restores the original image signal from the output from the differential decoding circuit 36 and outputs the image signal through an output terminal 40.

In a homodyne detection system, it is not possible to ascertain a modulated phase of a PSK signal designated by a demodulated digital code. That is, the phase of the PSK signal is indeterminate and the problem of phase indeterminacy is encountered. Conventionally, such phase indeterminacy is avoided by the operation of the differential encoding circuit 16 and the differential decoding circuit 36. However, if a decoding error occurs due to a bad transmission line condition, the error is propagated to increase the bit error rate.

Phase indeterminacy may also be avoided by adding the same code as a carrier reproduction code attached to a leading end of a burst signal used in a time division multiple access (TDMA) communication. However, the degree of redundancy is thereby increased, resulting in a reduction in transmission efficiency.

SUMMARY OF THE INVENTION

An object of the present invention is to provide a data receiver free from the above-described problems.

To achieve this object, according to one aspect of the invention, there is provided a data receiver for use in a system for transmitting data by changing the data into transmitted frames and by phase-modulating the data in a digital manner, the data receiver comprising demodulation means for demodulating a phase-modulated signal by homodyne detection, conversion means for converting the phase of an output from the demodulation means into a correct phase, and sync detection means for detecting sync data of the transmitted frames from an output from the conversion means and for controlling the conversion means on the basis of a sync data undetected condition.

According to another aspect of the invention, there is provided a data receiver for use in a system for transmitting data by changing the data into transmitted frames and by phase-modulating the data in a digital manner, the data receiver comprising demodulation means for demodulating a phase-modulated signal by homodyne detection, and sync detection means for detecting sync data of the transmitted frames from an output from the demodulation means and for controlling a reproduction carrier of the demodulation means on the basis of a sync data undetected condition.

It is possible to cancel a phase indeterminate condition of a phase-modulated signal at the time of homodyne detection demodulation by using these means. That is, the need for differential encoding and decoding means is eliminated and an increase in redundancy can be avoided.

These and other objects, features and advantages of the present invention will become apparent from the following description of preferred embodiments of the invention taken in conjunction with the accompanying drawings.

BRIEF DESCRIPTION OF THE DRAWINGS

FIGS. 6(1)–6(3) define a waveform diagram of the circuit shown in FIG. 5; and

DESCRIPTION OF THE PREFERRED EMBODIMENTS

An embodiment of the present invention will be described below with reference to the drawings.

Figure 2:
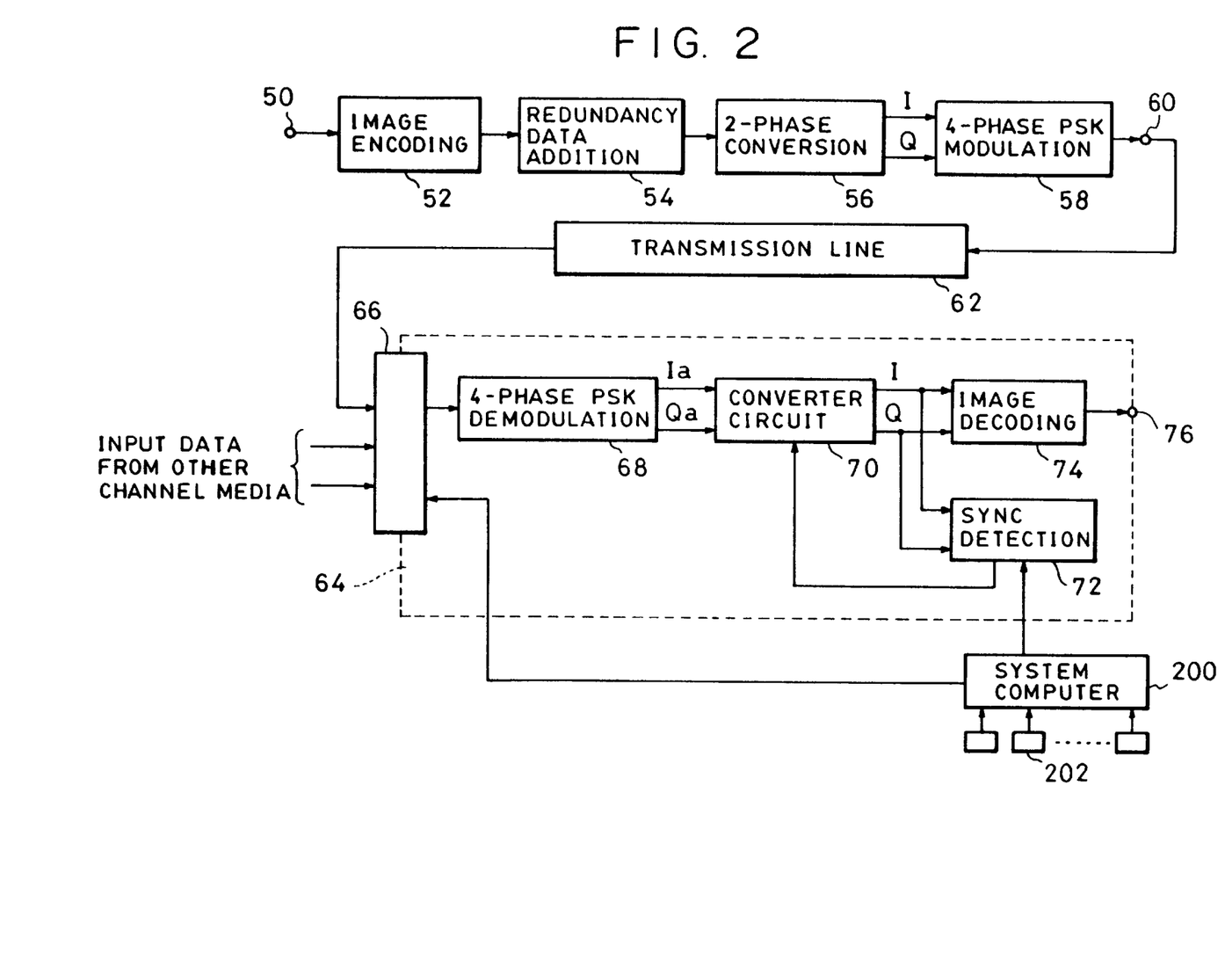
FIG. 2 is a schematic block diagram of an embodiment of the present invention.

Referring to FIG. 2, a transmission system in accordance with the embodiment of the present invention has an input terminal 50 to which an image signal to be transmitted is supplied, an image encoding circuit 52 for encoding the image signal from the input terminal 50, a redundancy data addition circuit 54 for separating output codes from the image encoding circuit 52 with respect to transmission frames and for adding sync data, error correction codes and the like to the separated codes, a two-phase conversion circuit 56 for separating output data from the redundancy data addition circuit 54 into two phases, i.e., an I phase and a Q phase, a four-phase PSK modulation circuit 58 for modulating I data and Q data output from the two-phase conversion circuit 56 by four-phase PSK modulation, and an output terminal 60 through which an output from the four-phase PSK modulation circuit 58 is output to a transmission line 62.

A block 64 represents a data receiver of this embodiment. The data receiver 64 has an input terminal through which modulated waves transmitted through the transmission line 62 is received, a four-phase PSK demodulation circuit 68 for demodulating modulated waves from the input terminal 66 by homodyne detection, a converter circuit 70 for converting outputs Ia and Qa having two indeterminate phases from the four-phase PSK demodulation circuit 68 into data I and Q having correct phases, a sync detection circuit 72 for detecting sync data from the outputs I and Q from the converter circuit 70 and for controlling the converter circuit 70 on the basis of the result of this detection, an image decoding circuit for restoring the original image signal from an output from the converter circuit 70, and an output terminal 76 through which the received image signal is output.

Figure 3A:
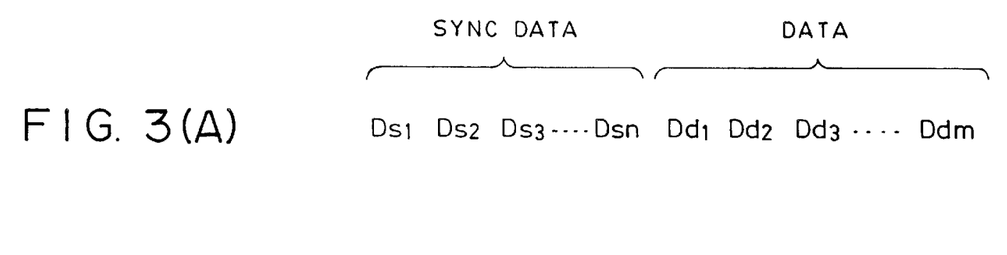
FIGS. 3(A) through 3(B) are diagrams of waveforms in circuit portions.
Figures 3B, 3C:
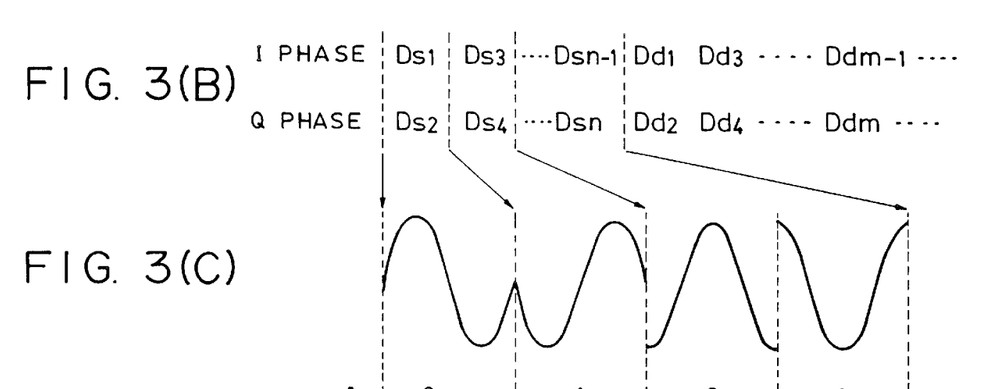

The fundamental operation of the system shown in FIG. 2 will be described. The image encoding circuit 52 encodes an image signal from the input terminal 50. The redundancy data addition circuit 54 separates output codes from the image encoding circuit 52 with respect to transmission frames and adds sync data, error correction codes and the like to the separated codes with respect to the transmission frames to form data series, such as that formed of series of sync data Ds and series of Dd as shown in FIG. 3(A). The two-phase conversion circuit 56 separates output data from the redundancy data addition circuit 54 into two phases, i.e., I and Q phases, as shown in FIG. 3(B). The four-phase PSK modulation circuit 58 modulates I data and Q data output from the two-phase conversion circuit 56 by four-phase PSK modulation, as shown in FIG. 3(C). An output from the four-phase PSK modulation circuit 58 is output to the transmission line 62 through the output terminal 60.

Figure 3D:
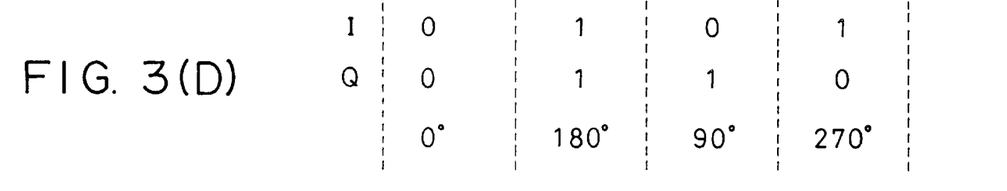

Four-phase PSK modulation is performed in such a manner that combinations of the I and Q phases (0, 0), (1, 0), (1, 1) and (0, 1) are output as phase waves of 0°, 90°, 180° and 270°, as shown in FIG. 3(D).

Modulated waves transmitted through the transmission line are input to the input circuit 66 of the data receiver 64. The four-phase PSK demodulation circuit 68 demodulates the modulated waves from the input terminal 66 by homodyne detection. The phases of the outputs Ia and Qa of two phases from the four-phase PSK demodulation circuit 68 are indeterminate. The converter circuit 70 converts outputs the two phase outputs Ia and Qa from the four-phase PSK demodulation circuit 68 into correct phases on the basis of a control signal from the sync detection circuit 72.

The converter circuit 70, which will be described in detail, directly passes the two phase outputs Ia and Qa from the four-phase PSK demodulation circuit 68 as its outputs in a first step. If the phases of the outputs I and Q from the converter circuit 70 are correct, the sync detection circuit 72 can detect transmission frame sync data from the outputs from the converter circuit 70. If the phases are incorrect, the sync detection circuit 72 cannot detect the transmission frame sync data. Therefore, the arrangement is such that the converter circuit 70 is controlled by a pulse signal of a predetermined period indicating that a synchronized state is not detected by the sync detection circuit, and the converter circuit 70 is thereby made to operate so that the output phases of the four-phase PSK demodulation circuit 68 become correct.

That is, in this embodiment, the sync detection circuit 72 detects sync data from output data I and Q from the converter circuit 70 and, if it detects no sync data n times (n: an arbitrary natural number), it outputs a pulse signal designating a sync-undetected condition to the converter circuit 70 at kn times (k: a predetermined integer described below).

The phase output data I and Q from the converter circuit 70 is thereby obtained with correct phases and the image decoding circuit 74 restores the image signal from the outputs I and Q from the converter circuit 70 and outputs the restored signal to through the output terminal 76.

Figure 4A:
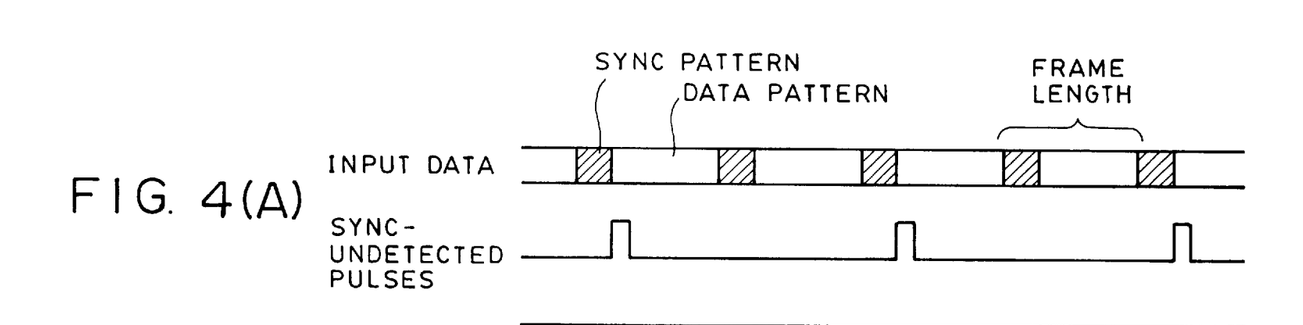
FIGS. 4(A) and 4(B) are diagrams of the relationship between the frame length of input data and an output from a sync detection circuit.
Figure 4B:
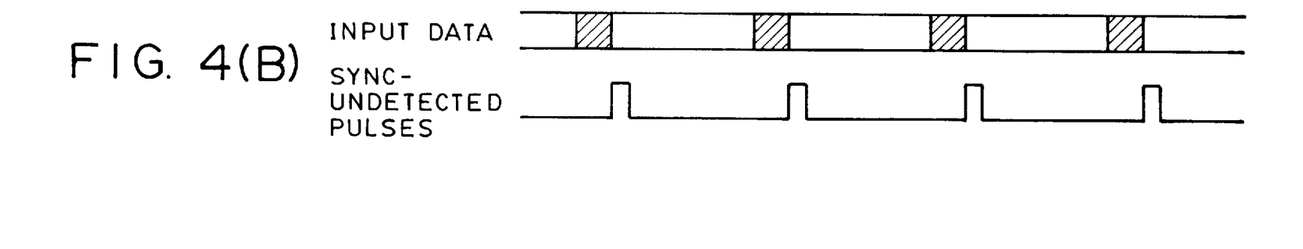

In this embodiment, the value is variably set on the basis of channel data or media selection data which is output from a system computer 200 by operating operation keys 202. That is, as shown in FIGS. 4(A) and 4(B), the value k is set according to the data frame length (period of sync data) and is changed if the frame length is changed depending upon the kind of input data and other factors. The speed of the conversion operation of the conversion circuit 70 can be increased by changing the value k. The system computer 200 can change the channel of the input stage 66 by the operation of the operation keys 202.

Figure 5:
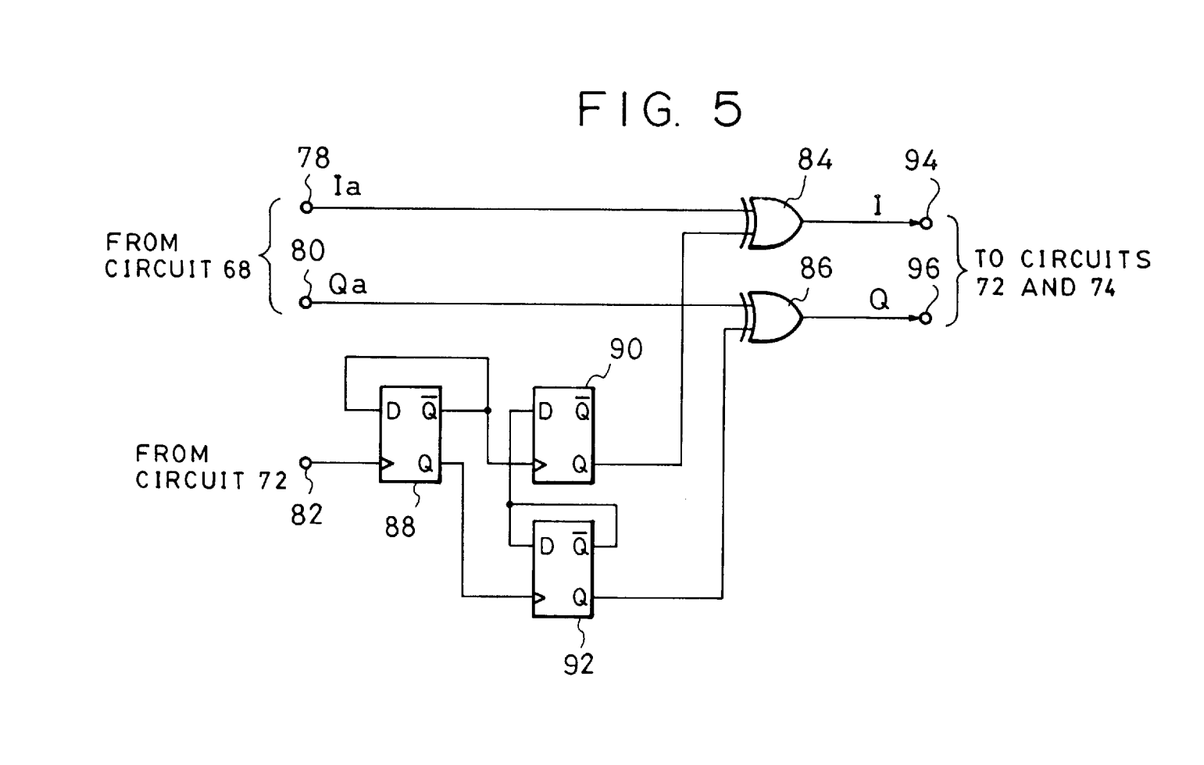
FIG. 5 is a detailed circuit diagram of phase conversion circuit 70.
Figure 6:
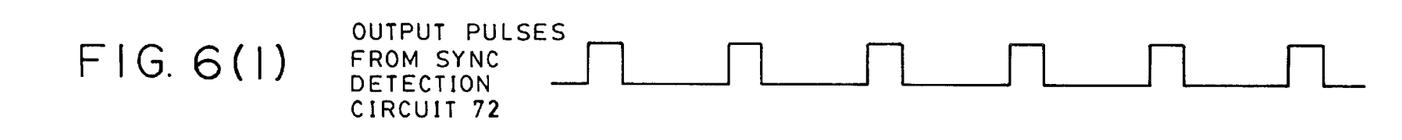

FIG. 5 shows details of the converter circuit 70. The converter circuit 78 has an input terminal 78 to which output data Ia from the four-phase PSK demodulation circuit 68 is supplied, an input terminal 80 to which output data Qa from the four-phase PSK demodulation circuit 68 is supplied, an input terminal 82 to which a pulse signal designating a sync-undetected condition from the sync detection circuit 72 is supplied, an exclusion OR circuit 84 for changing the phase of data Ia from the input terminal 78, an exclusive OR circuit 86 for changing the phase of data Qa from the input terminal 80, latch circuits 84 and 90, and 92 for controlling the exclusive OR circuits 84 and 86 on the basis of pulse signals supplied to the input terminal 82, an output terminal 94 through which phase-changed data I is output, and an output terminal 96 through which phase-changed data Q is output.

FIG. 6 is a diagram of waveforms in the circuit shown in FIG. 5. The sync detection circuit 72 has an output such as that shown in (1) of FIG. 6 (input pulses supplied to the input terminal 82), the latch circuit 90 has an output such as that shown in (2), and the latch circuit 92 has an output such as that shown in (3). As is apparent from FIG. 6, the exclusive OR circuit 84 and 86 are gate-controlled on the basis of the combination of "0" and "1" of the outputs from the latch circuits 90 and 92. Also, this gate control is performed repeatedly in a cycle corresponding to the period of the above-mentioned output pulses from the sync detection circuit 72, and the time taken for conversion can be reduced by changing the value K, i.e., by changing the period of the output pulses. The output from the sync detection circuit 72 is supplied to a clock input terminal of the latch circuit 88. The latch circuit 88 has an inverted Q output supplied to a clock input terminal of the latch circuit 90, and a Q output supplied to a clock input terminal of the latch circuit 92. Therefore, the phases of the outputs from the latch circuits 90 and 92 are shifted from each other, as shown in (2) and (3) of FIG. 6, and one of them is inverted each time an output pulse is supplied from the sync detection circuit 72.

The output from each of the latch circuits 90 and 92 is applied to one of two input terminals of the exclusive OR circuits 94 and 96, and data Ia and Qa from the input terminals 78 and 80 is supplied to the other input terminals of the exclusive OR circuits 94 and 96. Therefore, the phase of data Ia and Qa is inverted, i.e., shifted through 90° each time the sync detection circuit 72 outputs a pulse. In this manner, phase-indeterminate data Ia and Qa output from the four-phase PSK demodulation circuit 68 is converted into data I and Q having correct phases.

In the above-described embodiment, a phase indeterminate condition is canceled by the conversion circuit 70. However, the four-phase PSK demodulation circuit 68 may be arranged to have a carrier wave reproduction circuit which is controlled on the basis of the output from the sync detection circuit 72 to achieve the same effect.

Figure 7:
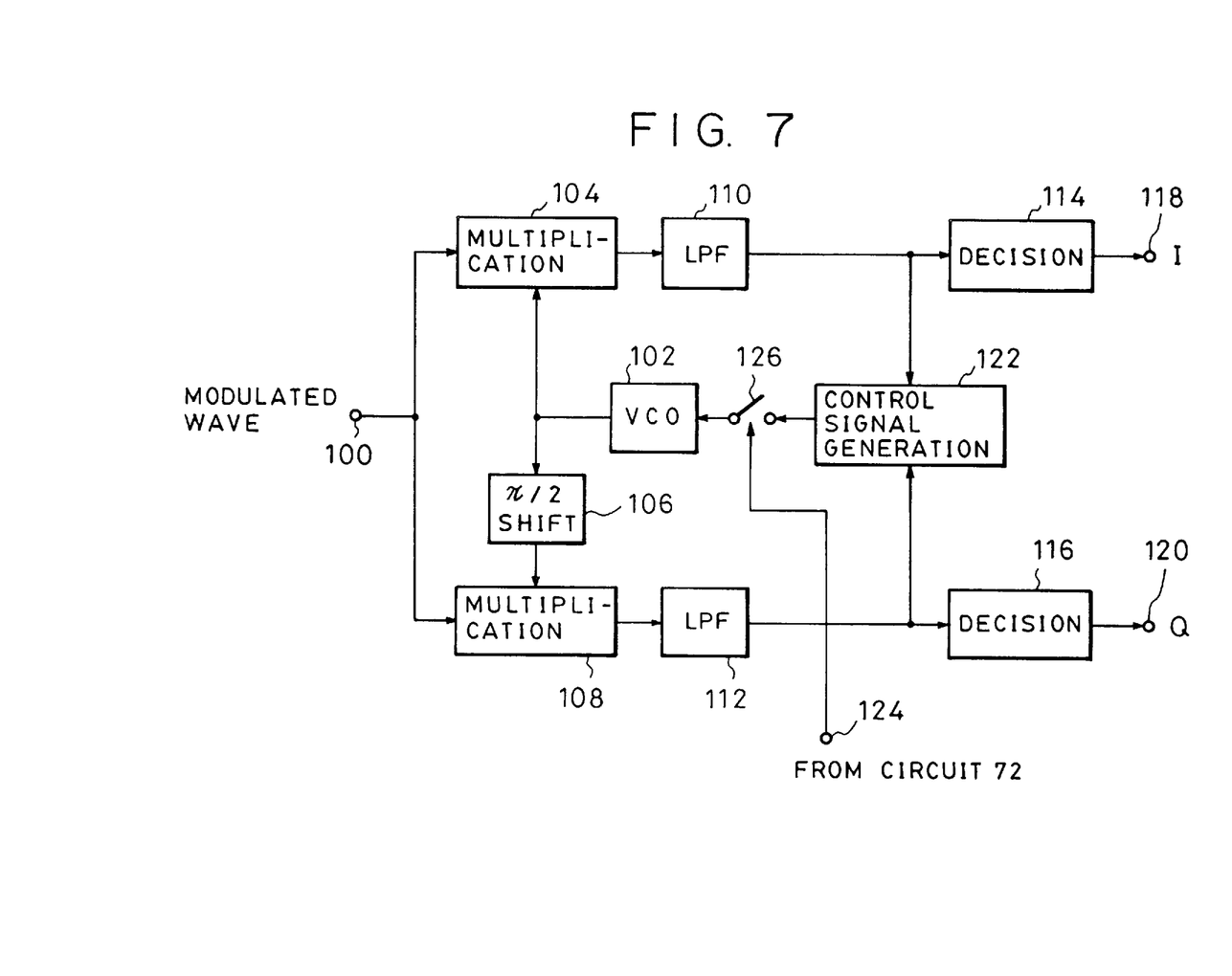
FIG. 7 is a schematic block diagram of another embodiment of the present invention in which a carrier reproduction circuit of a demodulation circuit is controlled.

Another embodiment of the present invention in which a four-phase PSK demodulation circuit using a so-called Costas loop is controlled will be described below. FIG. 7 is a schematic bloc diagram of the type four-phase PSK demodulation circuit using a Costas loop.

The four-phase modulation circuit using a Costas loop has an input terminal through which modulated waves are input from the transmission line, a voltage-controlled oscillator (VCO) 102 for generating a reproduction carrier, a multiplier 104 for multiplying modulated waves from the input terminal 100 by the reproduction carrier from the voltage-controlled oscillator 102, a shift circuit 106 for shifting the reproduction carrier generated by the voltage controlled oscillator by $\pi/2$, a multiplier 108 for multiplying modulated waves from the input terminal 100 by the reproduction carrier $\pi/2$ shifted by the shift circuit 106, low pass filters (LPF) 110 and 112 for removing unnecessary high frequency components from outputs from the multipliers 104 and 108, decision circuits 114 and 116 for converting outputs from the LPFs 110 and 112 into digital values 0 and 1, and output terminals 118 and 120 through which digital values from the decision circuits 114 and 116 are output.

The four-phase modulation circuit using a Costas loop also has a control signal generation circuit 122 for generating a signal for controlling the voltage-controlled oscillator 102 according to the outputs from the LPFs 110 and 112, an input terminal 124 through which the pulse signal from the sync detection circuit 72 is input, and a normally-closed switch 126 which is temporarily opened by a pulse signal from the input terminal 124 to output a bias signal generated by the control signal generation circuit 122 to a control terminal of the voltage-controlled oscillator 102.

In the four-phase PS demodulation circuit using the thus-formed Costas loop, the frequency of the reproduction carrier for demodulation is controlled by demodulated signals. That is, the control signal generation circuit 122 generates the voltage for controlling the voltage-controlled oscillator 102 according to the outputs from the LPFs 110 and 112. If the control loop is locked, the phase of the reproduction carrier is locked with a certain phase difference (0°, 90°, 180° or 270°) from a reference phase set on the modulator side.

The sync detection circuit 72 cannot detect sync data unless the phase of the reproduction carrier matches with the phase set as a reference on the modulator side, as mentioned above. In this embodiment, therefore, the switch 126 is controlled by a pulse signal output from the sync detection circuit 72 and designating the sync-undetected condition. During the time when this pulse signal is high, the switch 126 is opened. The voltage-controlled oscillator 102 is thereby caused to oscillate with a fixed bias. When the output pulse from the sync detection circuit 72 drops, the Costas loop is closed again to control the voltage-controlled oscillator 102 by the control signal generated by the control signal generation circuit 122.

In this manner, the Costas loop opening/closing control is repeated until data output from the output terminals 118 and 120 has correct phases, that is the phase of the reproduction carrier matches with the reference phase of the modulator side. When sync data is detected, the operation of the demodulation circuit shown in FIG. 7 is stabilized in the corresponding state.

The probability of phase matching is ¼ at the time of each switching. It is therefore anticipated that switching is performed will be performed several times until sync data is detected. However, such a condition raises no considerable problem in the case of a demodulator arranged to achieve good image transmission by processing a continuous signal in comparison with a TDMA demodulator or the like, although a comparatively long carrier reproduction time is required.

The embodiments have been described with respect to examples of a four-phase phase shift keying system. Needless to say, the present invention can also be applied to other amplitude modulation systems. Also, transmitted information is not limited to image information.

According to the present invention, as can be easily understood from the above description, a phase indeterminate condition of a sync detection can be canceled without increasing redundancy. Also, the transmission error rate is not reduced even if transmission line conditions become worse. It is therefore possible to achieve a high transmission efficiency even in a communication using a transmission medium having an inferior line condition, such as a satellite communication line.

In the above-described embodiments, the present invention is applied to a receiver for receiving PSK modulated waves. However, the present invention can also be applied to receivers for receiving any other phase-modulated waves.

What is claimed is:

1. A data receiver comprising:

input means for inputting a received phase-modulated signal including information data and sync data;

detection means for detecting the sync data in the received signal;

control means for generating a control signal at a set cycle according to an output of said detection means;

setting means for manually setting the cycle; and changing means for changing a state of the information data in response to the control signal.

2. A data receiver according to claim 1, wherein said receiving means receives plural kinds of phase-modulated signals, each kind of phase-modulated signal having sync data for respectively different periods.

3. A data receiver according to claim 1, wherein said setting means sets the cycle period according to a period of sync patterns in the first-mentioned cyclical series.

4. A data receiver according to claim 1, wherein the cycle of said control means relates to a cycle of the sync data of the received signal.

5. A data receiver according to claim 1, wherein said changing means comprises demodulating means for demodulating the received signal to provide an output signal, converting means for converting a phase of the output signal in response to the control signal to provide a converted signal and restoring means for restoring the information data in response to the converted signal.

6. A data receiver according to claim 5, wherein said detection means detects the sync data in the converted signal.

7. A data receiver for receiving a phase-modulated signal, the phase-modulated signal having been formed by changing data into transmission frames, adding respective sync data to the transmission frames to provide an output data signal and digitally phase-modulating the output data signal to produce the phase-modulated signal, said data receiver comprising:

demodulation means for demodulating the received phase-modulated signal by homodyne detection to provide a demodulated signal;

conversion means for converting a phase of the demodulated signal to a correct phase to provide an output signal;

sync detecting means for detecting the sync data of the transmission frames from the output signal of said conversion means and for controlling said conversion means on the basis of a sync data undetected condition in a set cycle of said sync detecting means; and     setting means for manually setting the cycle of said sync detecting means.

8. A data receiver for receiving a phase-modulated signal, the phase-modulated signal having been formed by changing digital information data into transmission frames, then adding respective sync data to the transmission frames to provide transmission data comprising a predetermined number of types of data patterns each representing different codes, the transmission data including at least one data pattern of a first type, and then digitally phase-modulating the transmission data to produce the phase-modulated signal, said data receiver comprising:

demodulation means for demodulating the received phase-modulated signal by homodyne detection to output the transmission data;

sync detection means for detecting the sync data of the transmission frames from the transmission data output from said demodulation means; and     control means for changing the one data pattern of the first type in the transmission data output from said demodulation means into a data pattern of a second, different type from among the number of data types according to a detection result of said sync detection means.

9. A data receiver for receiving a phase-modulated signal, the phase-modulated signal having been formed by obtaining, from digital information data including specific data, transmission data comprising a predetermined number of types of data patterns each representing different codes, the transmission data including at least one data pattern of a first type, and then digitally phase-modulating the transmission data to produce the phase-modulated signal, said data receiver comprising:

demodulation means for demodulating the received phase-modulated signal to output the transmission data;

detection means for detecting the specific data of the digital information data from the transmission data output from said demodulation means; and     control means for selectively setting one of the predetermined number of types of data patterns as a data pattern to be output from said demodulation means according to a detection result of said detection means.

10. A data receiver according to claim 9, wherein the specific data is sync data and the digital information data is divided into periods and includes the sync data every period.

11. A data receiver according to claim 9, wherein the predetermined number of types of data patterns comprise a plurality of combinations of bits of digital data respectively representing the different codes.

12. A data receiver according to claim 11, wherein the transmission data comprises four types of data patterns each comprising two bits of digital data.

13. A data receiver according to claim 9, wherein said demodulation means demodulates the received phase-modulated signal by homodyne detection.

14. A data receiver according to claim 9, wherein the received phase-modulated signal was modulated by QPSK modulation.

15. A data receiver according to claim 9, wherein the received phase-modulated signal was modulated by a digital phase-modulation method other than a DPSK modulation.

16. A data receiver according to claim 9, wherein said control means sets the predetermined number of types of data patterns in a predetermined order.

17. A data receiver according to claim 9, further comprising restoring means for restoring the digital information data from the transmission data output from said demodulation means.

18. A data receiver according to claim 9, wherein said demodulation means comprises generating means for generating a first reference signal and a second reference signal different in phase from the first reference signal by $\pi/2$, first multiplexing means for multiplexing the received phase-modulated signal and the first reference signal, and second multiplexing means for multiplexing the received phase-modulated signal and the second reference signal.

19. A method of receiving a phase-modulated signal, the phase-modulated signal having been formed by obtaining, from digital information data including specific data, transmission data comprising a predetermined number of types of data patterns each representing different codes, the transmission data including at least one data pattern of a first type, and then digitally phase-modulating the transmission data to produce the phase-modulated signal, said method comprising the steps of:

demodulating the received phase-modulated signal to output the transmission data;

detecting the specific data of the digital information data from the transmission data output in said demodulation step; and     selectively setting one of the predetermined number of types of data patterns as a data pattern to be output in said demodulation step according to a detection result of said detection step.

20. A method according to claim 19, wherein the specific data is sync data and the digital information data is divided into periods and includes the sync data every period.

21. A method according to claim 19, wherein the predetermined number of types of data patterns comprise a plurality of combinations of bits of digital data respectively representing the different codes.

22. A method according to claim 21, wherein the transmission data comprises four types of data pattern each comprising two bits of digital data.

23. A method according to claim 19, wherein said demodulation step demodulates the received phase-modulated signal by homodyne detection.

24. A method according to claim 19, wherein the received phase-modulated signal was modulated by QPSK modulation.

25. A method according to claim 19, wherein the received phase-modulated signal was modulated by a digital phase-modulation method other than a DPSK modulation.

26. A method according to claim 19, wherein said control step sets the predetermined number of types of data patterns in a predetermined order.

\* \* \* \* \*

UNITED STATES PATENT AND TRADEMARK OFFICE
CERTIFICATE OF CORRECTION

PATENT NO. : 5,841,815

DATED : November 24, 1998

INVENTOR(S) : HIROSHI TAKIZAWA

It is certified that error appears in the above-identified patent and that said Letters Patent is hereby corrected as shown below:

COLUMN 2

Line 45, "3(B)" should read --3(D)--.

COLUMN 4

Line 21, "value" should read --value k--.

COLUMN 5

Line 50, "PS" should read --PSK--.

COLUMN 7

Line 46, Line 46 should be deleted;
    Line 47, "first type," should be deleted.

UNITED STATES PATENT AND TRADEMARK OFFICE
CERTIFICATE OF CORRECTION

PATENT NO. : 5,841,815

DATED : November 24, 1998

INVENTOR(S) : HIROSHI TAKIZAWA

It is certified that error appears in the above-identified patent and that said Letters Patent is hereby corrected as shown below:

COLUMN 8

Line 51, "pattern" should read --patterns--.

Signed and Sealed this

Twenty-second Day of June, 1999

Q. TODD DICKINSON

Attest:

*Attesting Officer*        *Acting Commissioner of Patents and Trademarks*